United States Patent [19]

Estéve

[11] Patent Number: 5,150,545
[45] Date of Patent: Sep. 29, 1992

[54] ARRANGEMENT FOR MEASURING THE DIAMETER OF CYLINDRICAL PARTS DURING THE MACHINING THEREOF

[75] Inventor: Xavier Estéve, Marin, Switzerland
[73] Assignee: Meseltron S.A., Corcelles, Switzerland
[21] Appl. No.: 738,862
[22] Filed: Aug. 1, 1991

[30] Foreign Application Priority Data

Aug. 2, 1990 [FR] France .................. 90 10018

[51] Int. Cl.⁵ ............................................. B24B 49/04
[52] U.S. Cl. ............................. 51/165.74; 51/165.91; 33/501.02
[58] Field of Search ........... 51/165.74, 165.91, 165.75, 51/165.76, 165.92, 165.9, 49, 238 S, 238 GG; 33/501.02

[56] References Cited

U.S. PATENT DOCUMENTS

| | | | |
|---|---|---|---|
| 2,603,043 | 7/1952 | Bontemps | 51/165 |
| 2,949,708 | 8/1960 | Wiatt et al. | 51/238 S |
| 3,174,328 | 3/1965 | Hollister et al. | 33/501.02 |
| 3,305,932 | 2/1967 | Iselin | 33/501.02 |
| 3,568,372 | 3/1971 | Asano et al. | 51/165 R |
| 3,603,044 | 9/1991 | Price | 51/165.91 |
| 4,524,546 | 6/1985 | Hoover et al. | 51/49 |
| 4,807,400 | 2/1989 | Corallo et al. | 51/165.91 |

FOREIGN PATENT DOCUMENTS

| | | |
|---|---|---|
| 1502477 | 1/1991 | Fed. Rep. of Germany . |
| 2570487 | 3/1986 | France . |
| 1099692 | 1/1968 | United Kingdom . |

Primary Examiner—Robert A. Rose
Attorney, Agent, or Firm—Griffin, Branigan & Butler

[57] ABSTRACT

This measuring arrangement (1) enables the self-calibration of cylindrical parts (2) in the course of machining and interrupts such machining when a predetermined dimension has been attained. It comprises a head (5) exhibiting a V opening bearing on the part to be measured (2) and a pneumatic sensor (10) associated therewith. The system includes coupling means (25, 26, 27, 29, 31, 32), urging means (33, 34) and sustaining means (39) for the head in order to assure a permanent contact between the part to be measured and contact pieces (8, 9) carried on the V opening. The arrangement offers a very small thickness so that it may attain narrow and deep zones as for example those of cylindrical crankshaft bearings.

9 Claims, 4 Drawing Sheets

ARRANGEMENT FOR MEASURING THE DIAMETER OF CYLINDRICAL PARTS DURING THE MACHINING THEREOF

This invention concerns a measuring arrangement, in particular in a machine tool, for interrupting the machining operation on a cylindrical part when such part has attained a predetermined diameter, such arrangement including:
- a head exhibiting an opening provided with two rectilinear ridges positioned in the form of a V and adapted to bear against the part to be machined, said head showing two parallel faces substantially perpendicular to the axis of the part to be machined, said parallel faces defining the thickness of the head,
- a sensor mounted on such head and arranged along the bisector of the angle formed by the two ridges, said sensor furnishing a signal representative of the diameter of the cylindrical part, the head being oriented relative to the part to be machined in a manner such that said bisector is situated in a plane substantially parallel to the horizontal,
- means coupling the head to a base fixed to the machine frame in order to assure contact of said ridges with the cylindrical part during the machining operation, said coupling means being arranged so as to assure the mobility and the retention of the head in a plane X-Y substantially perpendicular to the axis of the cylindrical part to be machined,
- elastic means urging the head against the part to be machined, and
- elastic means for sustaining the head with its coupling means on the base fixed to said machine frame.

BACKGROUND OF THE INVENTION

It is already known to measure the diameter of cylindrical parts in the course of machining (in process measurement). This is the case for instance for the measuring head called "Pinvar" (registered trademark) of the Italian company Marposs. In this arrangement, the rotating cylinder is sensed by two diametrally opposed contact pieces. One such contact piece is fixed along with the measuring head. The other is movable and is located at the end of a lever pivoted on the head. This system exhibits the difficulty of using movable levers which take up space with the bearings which they require and by the sealing arrangements necessary for their good functioning. One is thus brought to a measuring head of substantial thickness, say on the order of 18 mm. Such apparatus is accordingly unsuitable for example to in-process measuring of cylindrical crankshaft bearings of small dimensions, where the available space between crank pins is reduced to 10 mm for instance.

To overcome this difficulty, this invention preferably calls for a pneumatic sensor which may be obtained in diameters not exceeding 6 mm and which is commercialized for instance by the American company Bendix, manufacturer of Sheffield products. The applicant of this invention had the idea of associating such a pneumatic sensor with an arrangement itself known including a part in the form of a V groove. When the cylinder to be measured is engaged in the groove, it is sufficient to measure the distance between the ridge of the V and the surface of the cylinder in order to deduce therefrom the diameter of the cylinder. An explanatory description of this principle will be found in the work "Taschenbuch der Längenmesstechnik", Springer Verlag, Berlin, 1954, p. 466 and 467. Such a technique has been practised and described in the patent document FR-A-2 570 487 originating from the applicant of this invention. There, however, it concerns an apparatus for static measurement of the diameters of cylindrical parts. Although the cited document foresees the possibility for the measuring head to come to bear and to center itself under the part to be measured, there is not there found however any teaching which would permit utilization of such a system on cylinders in the course of machining and enabling self-calibration of said cylinders. In particular, the presence of the grinder prevents arranging the measurement apparatus under the cylindrical part, but requires the placing of such apparatus facing the grinder, which poses certain problems not solved by the cited document, particularly that of compensating the weight of the head of the measuring apparatus as will appear in the description to follow.

The patent document DE-B-1 502 477 discloses a measuring arrangement where there exist means coupling the head to a base fixed to the frame of the machine in order to assure contact of the ridges of the head with the part to be machined, such coupling means assuring the mobility and the maintenance of the head in an X-Y plane substantially perpendicular to the axis of the part to be machined. This same document also shows elastic means urging the head against the part to be machined. It will however be noted that either the coupling means or the elastic urging means are not confined within a space bounded by the extension of the two parallel faces defining the thickness of the head. In particular, the document shows elastic urging means formed with the aid of four vertical and flexible blades. These blades are evidently located outside the space bounded by the thickness of the head. Such arrangements lead thus to a head of substantial thickness, not permitting the attainment of narrow and deep zones as is the case in crankshafts of small dimensions suggested hereinabove. Furthermore, the arrangement of the cited document does not provide any elastic sustaining means for the head, such head bearing by its own weight on the part to be machined, which tends to cause irregular wear of the contact pieces on the head. Finally, it will be mentioned that the horizontal spring blades work in compression when the head bears on the part to be machined, this requiring the use of thick blades which are thus not very flexible.

The patent document GB-A-1 099 692 also provides coupling means assuring the mobility and the maintenance of the head in an X-Y plane, as well as elastic means urging the head against the part to be machined. However, the means coupling the head to the machine frame are situated outside the thickness of the head and contribute thus to render such head wider. Furthermore, there exists no elastic sustaining means for the head, which brings about the wear suggested in the preceding paragraph.

BRIEF SUMMARY OF THE INVENTION

To overcome the mentioned difficulties, the present arrangement is characterized by the fact that said sensor, said coupling means, said elastic urging means and said elastic sustaining means are all located within a space bounded by the extension of said two parallel faces defining the thickness of the head.

The invention will now be set forth in the description to follow which employs the drawings illustrating it by way of example.

DESCRIPTION OF THE PREFERRED EMBODIMENT

Figure 1:
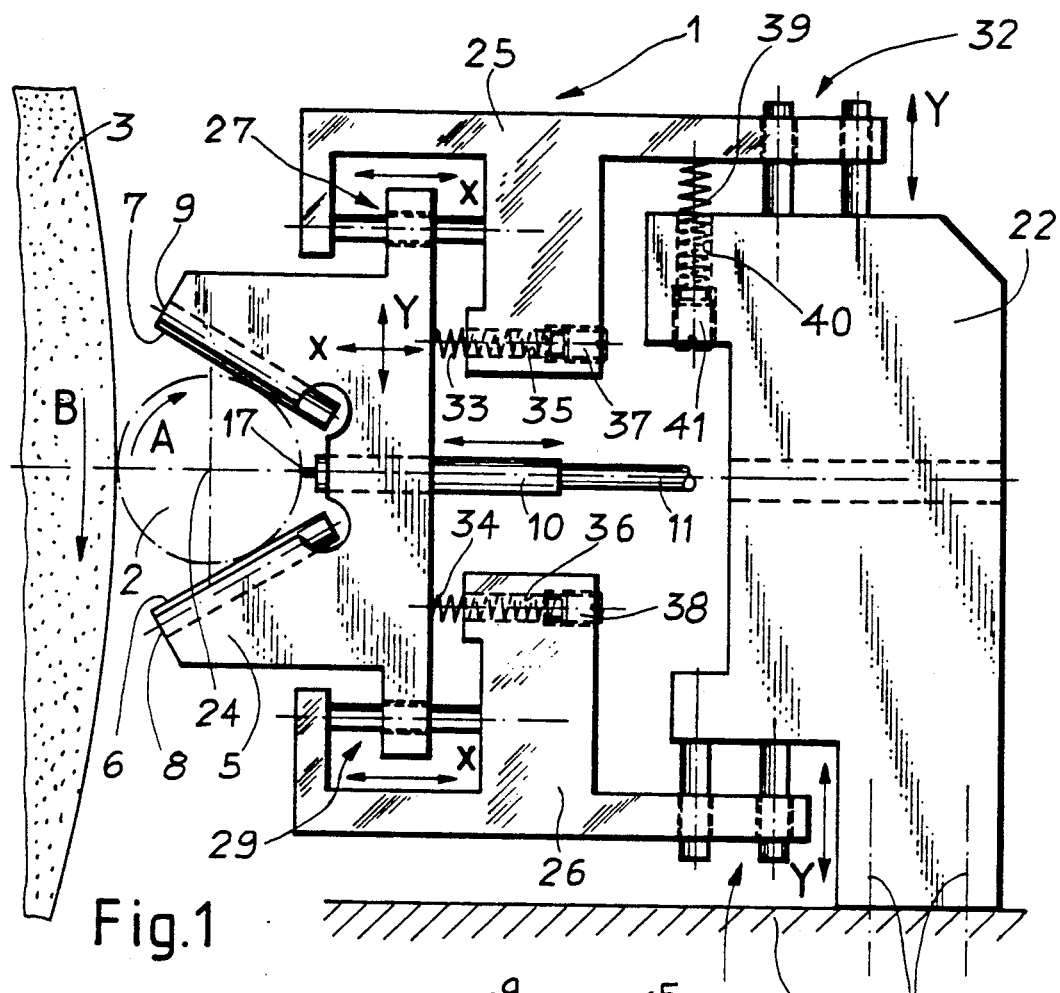
FIG. 1 is a drawing of the principle of the measuring arrangement, explaining the bases on which the present invention is founded.

FIG. 1 which is a drawing of the principle of the measuring arrangement 1 in accordance with the invention, shows at 2 the cylindrical part to be machined and at 3 the grinder established for such machining. The frame of the machine tool is symbolized by 4. The part to be machined 2 is driven for instance by a part-carrying chuck in the sense of arrow A and grinder 3 is driven in the sense of arrow B. When the diameter of the part 2 has attained a predetermined dimension, the grinder 3 is withdrawn so that the machining operation is interrupted.

As shown on FIG. 1, the measuring arrangement 1 includes a head 5 which exhibits an opening provided with two rectilinear ridges 6 and 7 positioned in the form of a V. The ridges bear against part 2 and here are materialized by cylindrical bar generatrices or contact pieces 8 and 9 formed of hard material, tungsten carbide for instance. On head 5 is mounted a sensor 10 arranged along the bisector of the angle formed by the ridges 6 and 7, such sensor furnishing in a well-known manner a signal representative of the diameter of the part to be machined. One also notes that head 5 is oriented relative to the part to be machined in a manner such that such bisector is located in a plane substantially parallel to the horizontal, here symbolized by the frame 4 of the machine.

Figure 2:
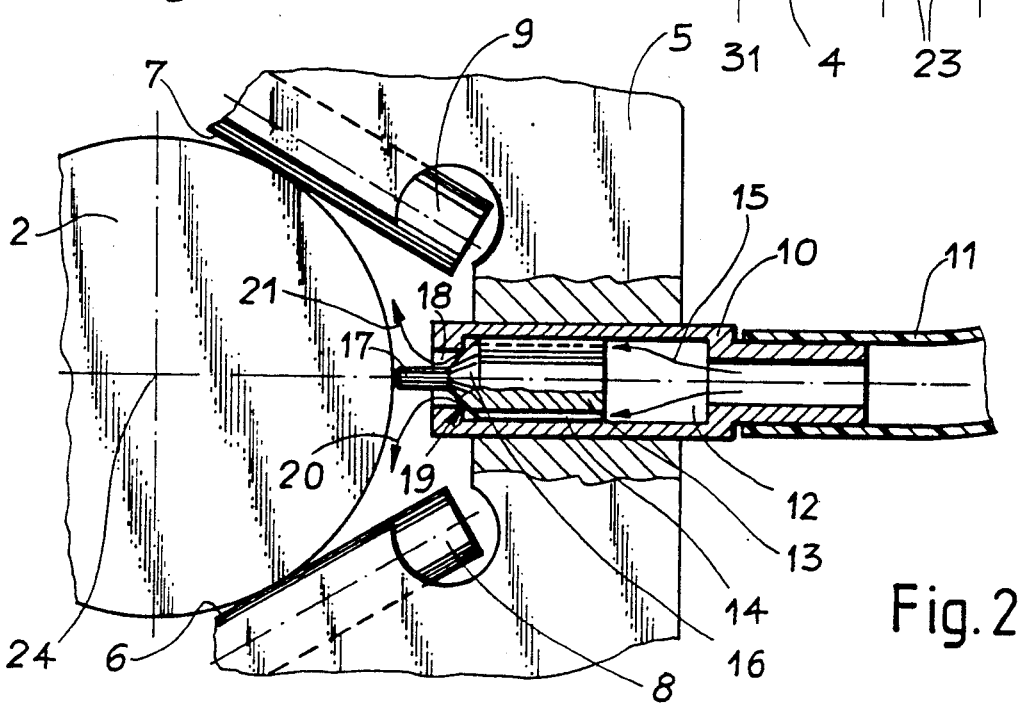
FIG. 2 is a drawing of a portion of FIG. 1 and showing in detail the operation of the preferred sensor.

FIG. 2 shows sensor 10 in detail. Here it concerns a pneumatic sensor of the indirect leakage type. Air 15 under pressure is blown into the flexible tube 11 which is fitted into the sensor 10 as such. The sensor includes a chamber 12 in which may move a piston 13. Such piston is provided with channels 14 to allow passage of the air. The piston terminates with a cone 16 and a feeler 17. When the sensor is free, the piston blocks the orifice 18 by the cone 13 bearing on a flange 19 exhibited by such orifice 18. When the piston 17 is pushed back towards the right, which happens when the diameter of the part 2 diminishes under the effect of the working of the grinder, air may flow according to arrows 20 and 21. At such moment the air flow varies the consequence of which is to cause variation of the pressure which is then a measurement of the penetration of the feeler into the sensor.

It is thus that, during the machining operation, the head 5 bears constantly against part 2 and above all adapts itself to the inevitable relative motions of the part with respect to the head due, for instance, to defects of circularity or coaxiality of the part, the lack of precision in the positioning of the measuring head or indeed to effects brought about by thermal expansion. Such adaptation is possible, according to this invention, thanks to the fact that the measuring arrangement includes means coupling the head to a base 22 fixed to the frame 4, such fixation being shown schematically on FIG. 1 by screw axes 23. The coupling means which will be described in detail hereinafter, are thus arranged in order that the head may be movable at the same time as being maintained in an X-Y plane substantially perpendicular to the axis 24 of the cylindrical part to be machined. Arrows X-Y placed on the head 5 of FIG. 1 materialize such mobility.

In addition to the coupling means for the head, just put into evidence, which coupling means, as may be recalled, serve to adapt the head to relative motions of the part in respect of the head, it is necessary to urge such head with a certain force against the part to be machined, as will appear in greater detail hereinafter.

Finally, FIG. 1 shows that the head with its associated coupling means, must be sustained by elastic sustaining means relative to the base 22 fixed to the frame of the machine, and this in order to compensate for its own weight.

The coupling, urging and sustaining means are now about to be discussed having reference initially to FIG. 1 which is a drawing showing only the principle in order to explain this invention.

The coupling means between head 5 and base 22 include an upper element 25 and a lower element 26, such elements being located respectively above the axis 24 of the part to be machined and below said axis. Each of elements 25 and 26 is coupled to the head through first guide means 27 and 29 enabling a horizontal displacement X of the head according to a defined course. The upper element 25 is coupled to the head by means of first guide means 27 and the lower element 26 is coupled to the head 5 by means of first guide means 29. Each of elements 25 and 26 is furthermore coupled to the base 22 fixed to the machine frame 4 by means of second guide means 31 and 32 permitting a vertical displacement Y of the head 5 according to a defined course. The courses, according to X and Y, have been exaggerated on FIG. 1 in order to render more readily understandable the mechanism employed. As such courses must take into account the adaptation of the head 5 to the relative movements of the part with respect to the head, it will be understood that they are of small amplitude, 1 to 2 mm at the utmost.

The elastic means for urging the head against the part to be machined must exhibit a certain force, for instance on the order of 2N. The latter is assured by first springs 33 and 34 bearing on the one hand against head 5 and on the other hand in a housing 35, 36 formed in each of the upper 25 and lower 26 elements. FIG. 1 shows that such urging force may be adjusted by means of screws 37 and 38 provided in housings 35 and 36.

Finally, the elastic means for sustaining head 5 with its coupling means comprising the upper and lower elements 25 and 26 respectively include at least one second spring 39 bearing against the upper element 25 and located in a housing 40 formed in the base 22. It is understood that this second spring compensates for the weight of head 5 and elements 25 and 26 associated therewith. Here also, there has been provided a screw 41 in housing 40 in order to enable adjustment of the sustaining force compensating the weight of the head with its associated elements.

Figure 3:
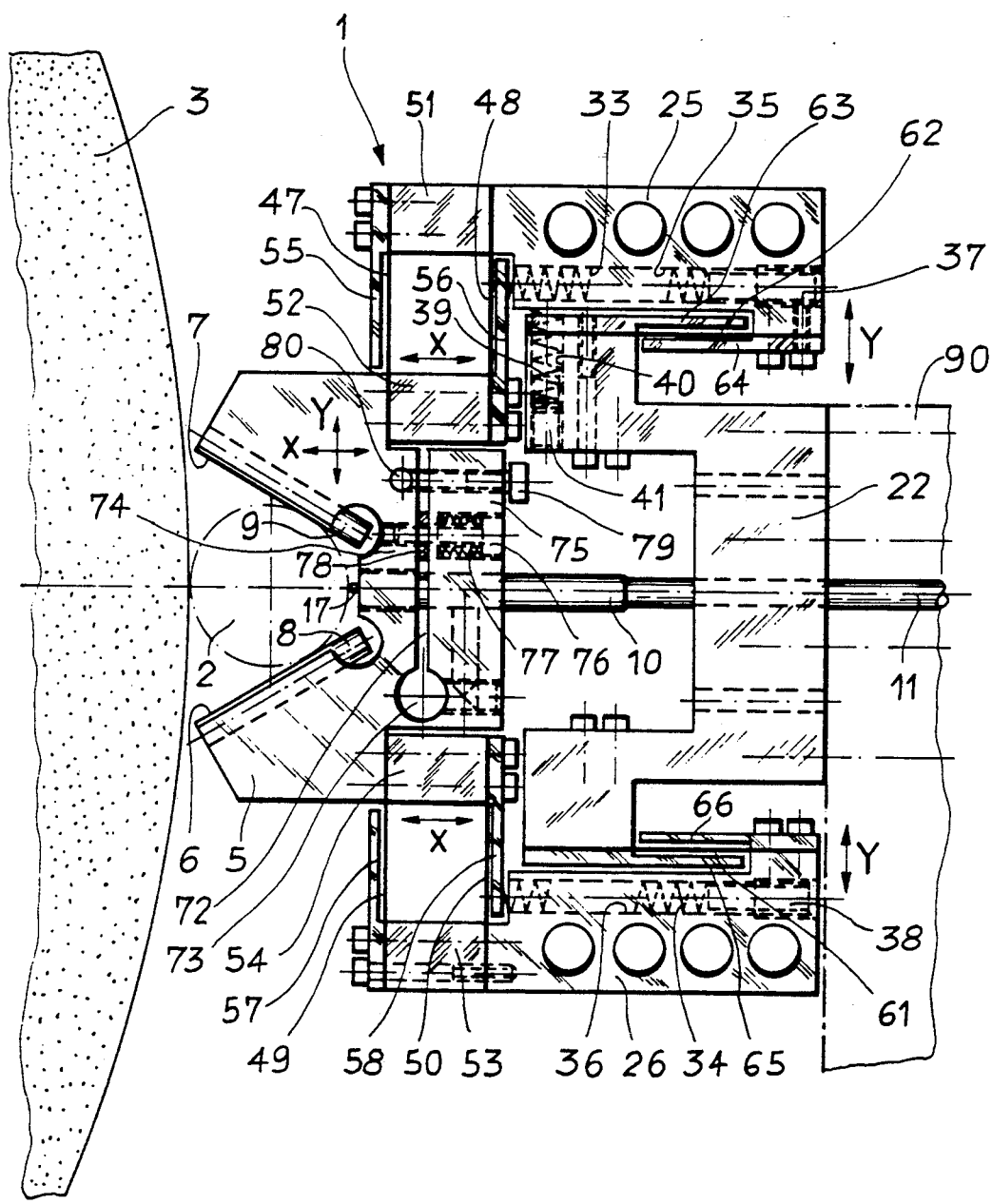
FIG. 3 is an elevational view of a preferred embodiment of the measuring arrangement according to the invention, the head being suitable for parts to be machined of small diameter.

FIG. 3 is an elevational view of a preferred embodiment of the invention where one finds again in principle all the components which constitute schematic execution shown on FIG. 1. Thus, in FIG. 3, there will again be found the same references as those which have been used on FIG. 1 for similar components.

Compared with the schematic execution, the preferred embodiment of FIG. 3 exhibits an important difference. The first guide means 27 and 29 have been replaced in FIG. 3 by elastic blades 47, 48, 49 and 50. Such blades are spaced apart from one another by sleeves 51 and 52 for the upper element 25 and by sleeves 53 and 54 for the lower element 26. Blades and sleeves are fixed to head 5 and to elements 25 and 26 respectively by screws visible on the drawing but not referenced. FIG. 3 shows that such screws likewise serve to fix projections 55 and 56, respectively 57 and 58, which are employed as course limiters, particularly when the head is not applied with the prescribed force against the cylindrical part to be machined. Projections 56 and 58 forming a portion of the head 5 also serve as a bearing point for the first springs 33 and 34.

The preferred embodiment of FIG. 3 also shows that the second guide means 31 and 32 of FIG. 1 have been replaced in FIG. 3 by elastic blades 61 and 62 fastened from one side to base 22 and from the other side to the lower and upper elements 26, 25 by means of screws visible on the drawing but not referenced. Projections 63, 64 and 65, 66 also serve as course limiters for these blades, particularly in the case where the arrangement would be found in a position other than that shown hereinabove.

Figure 6:
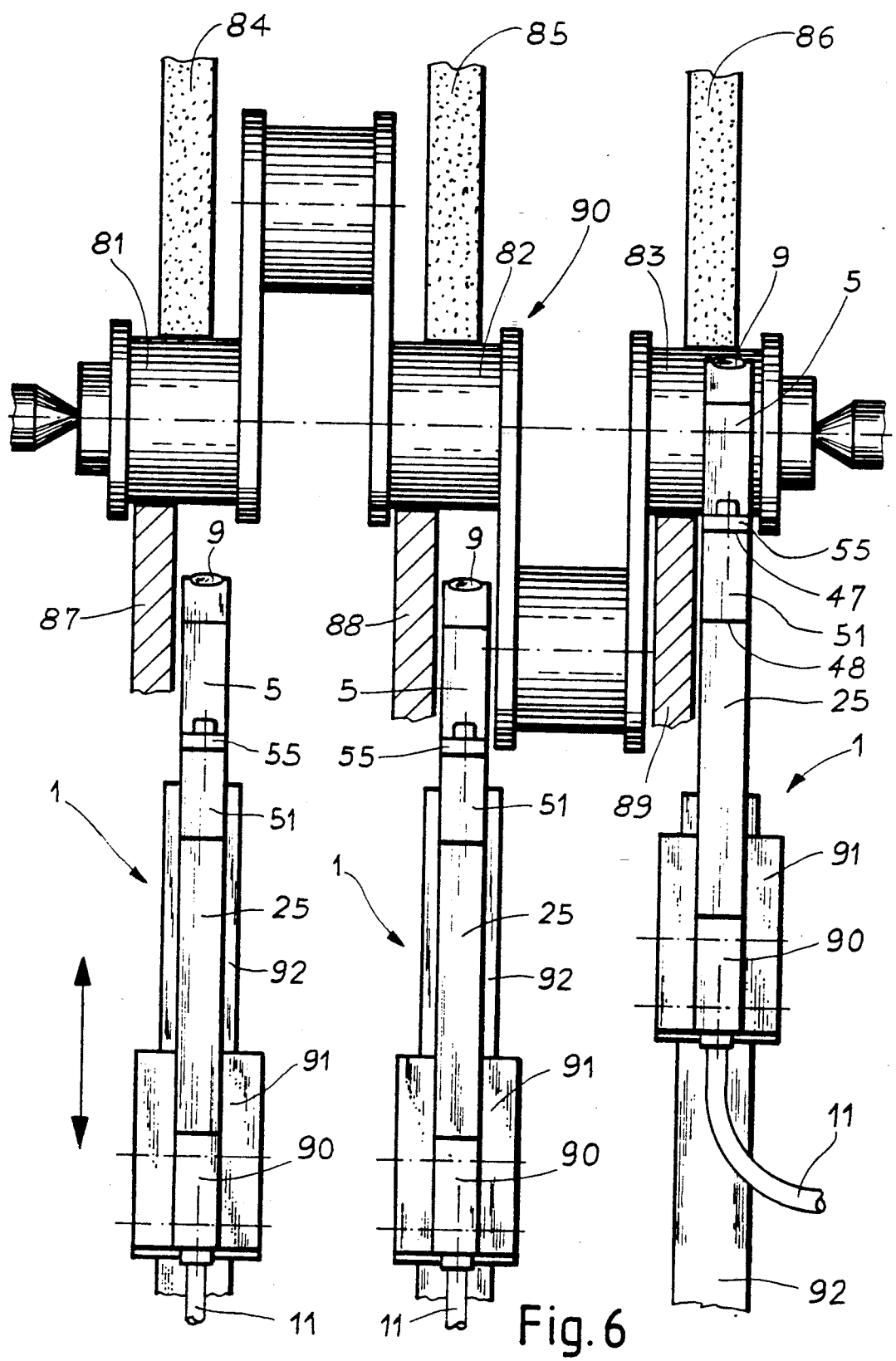
FIG. 6 is a top view of a crankshaft on which there have been represented three measuring arrangements in accordance with the invention, two such arrangements being withdrawn and the third straddling the cylindrical bearing surfaces which are to be machined.

FIG. 3 shows that base 22 is fastened by means of screws (the axes of which appear without being referenced) to a support 90, itself fixed to a chariot movably mounted in a slideway as will appear on FIG. 6.

The use of blades in place of the guide means employed on FIG. 1 gives rise to several important advantages. Initially, there is that of providing movement without jamming, rubbing or hysteresis. And above all that of proposing an arrangement which is rigid and without play in a direction perpendicular to the plane X and Y (axis Z).

Figure 4:
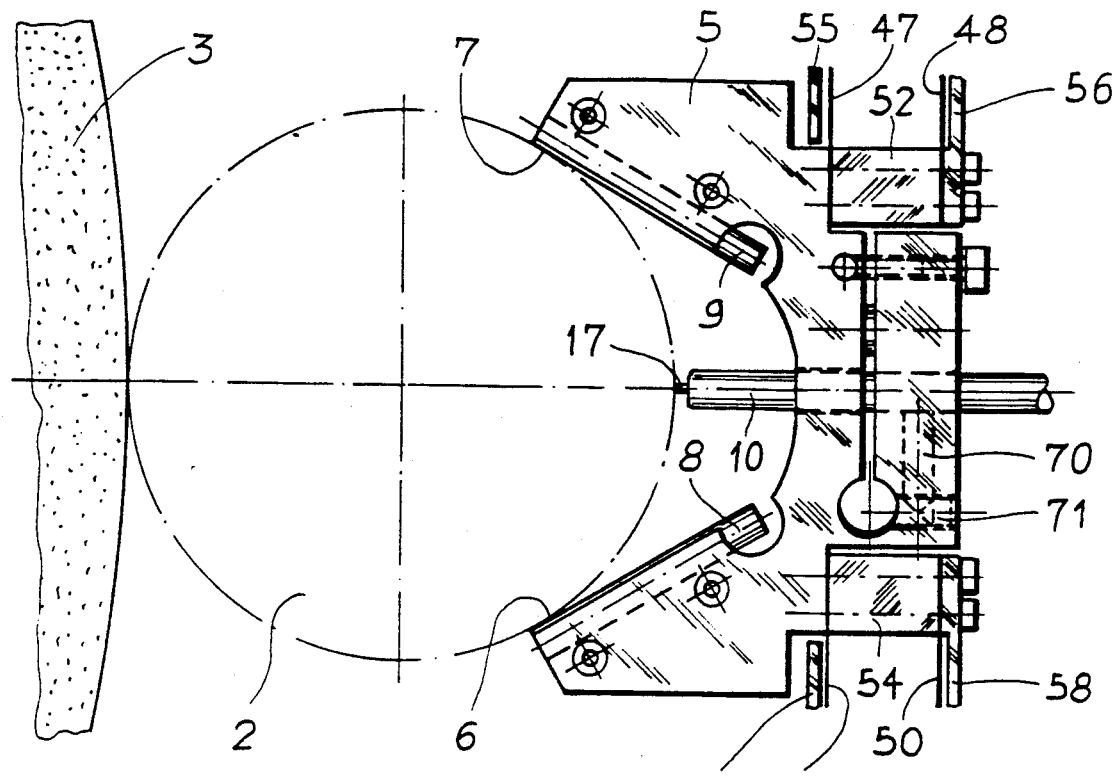
FIG. 4 shows a head adaptable for the arrangement of FIG. 2, such head being suitable for parts to be machined of medium diameter.
Figure 5:
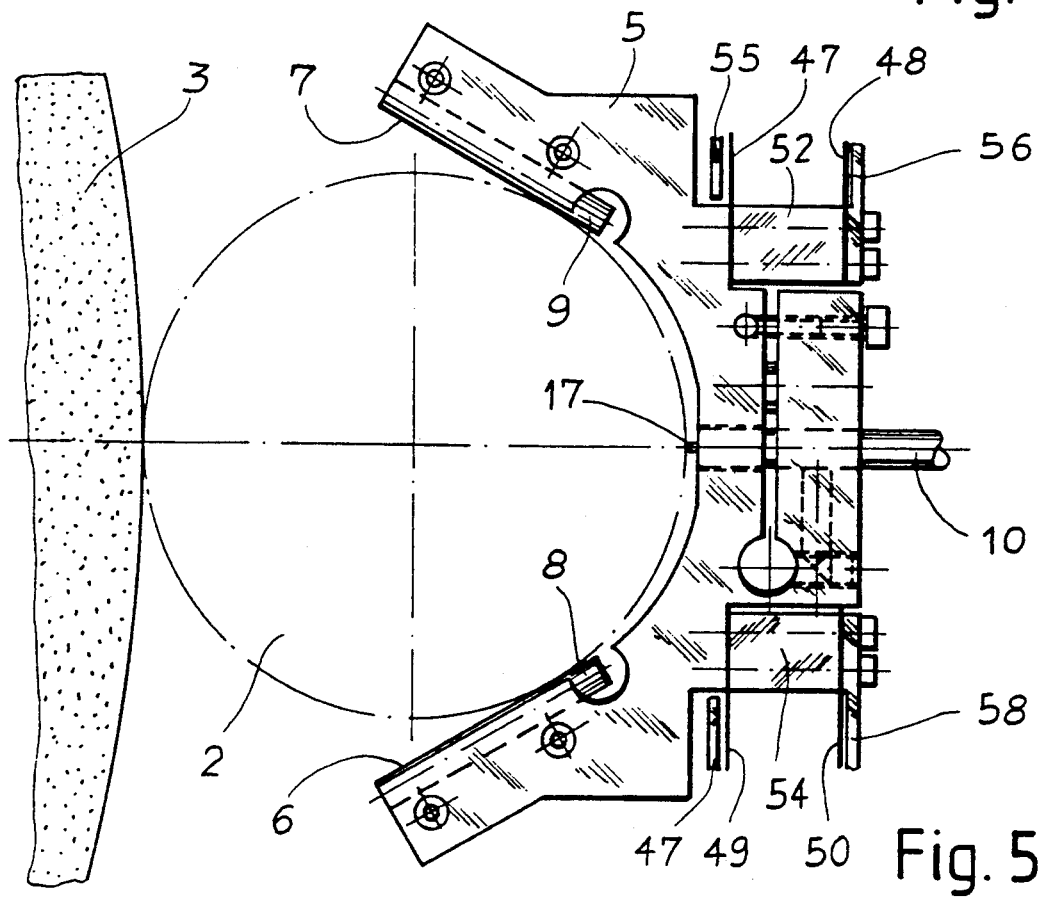
FIG. 5 shows a head adaptable on the arrangement of FIG. 4, such being suitable for parts to be machined of large diameter.

Should one be concerned with parts to be machined having greatly different diameters, the measuring arrangement may be offered in versions having various sizes, each version differing from the other only by the dimensions of its head which enables keeping the same base equipment. It will be noted however that the head, the upper and lower elements and the base being assembled by means of screws, there is no insurmountable difficulty in changing only the head of a given piece of equipment. FIGS. 3, 4 and 5 show three heads which may be mounted on the same upper 25 and lower 26 elements and on the same base 22 in order to cover diameters of parts to be machined extending from 30 to 125 mm. The head of FIG. 3 is employable for diameters of 30 to 55 mm, that of figure 4 for diameters from 55 to 90 mm and that of FIG. 5 for diameters of 90 to 125 mm. FIGS. 3 and 5 show parts to be machined, the diameter of which extends towards the minimum of what may be envisaged with the respective heads (for instance respectively 30 and 90 mm). FIG. 4 shows on the other hand a part to be machined being found at the maximum of the head capacity (for instance 90 mm).

FIGS. 4 and 5 point out clearly the necessity of being able to adjust the penetration of the sensor 10 in head 5. A coarse adjustment may be brought about by displacing sensor 10 by hand and blocking it by means of the conically tipped stem 17 controlled by screw 71 which also exhibits a conical tip (see FIG. 4). A fine adjustment of the overshooting of the sensor in the V opening is likewise necessary in order to proceed with calibration of the measuring means. For this, there is employed the system appearing entirely on FIG. 3. The back of head 5 includes a slot 72 and a moon opening 73 terminating such slot in a manner such that the rear portion of the head is separated into a forward block 74 and a rear block 75. A screw 76 compressing a spring 77 tends to bring together the two blocks, such coming together being limited by a sleeve 78. In order to withdraw the sensor to the rear, it is necessary to open slot 72 and thus to turn a screw 79 which bears on a stop 80 provided in the forward block.

In order to adjust the arrangement, one generally proceeds by way of comparison. A standard part having the dimension which one desires to obtain is placed in the apparatus. Then, one adjusts the penetration of the sensor coarsely, then finely, following what has been said hereinabove. The arrangement is made so that for such penetration the signal interrupting the machining is emitted. Then one replaces the standard part by the part to be machined, the diameter of such latter generally exceeding by some tenths of a millimeter the dimension to be attained. One urges the contact pieces 8 and 9 of head 5 against the part to be machined to the point where blades 47, 48, respectively 49 and 50, are approximately vertical. At such moment,. the force of application of the head against the part is that developed by the first springs 33 and 34 and the machining may commence. It will be interrupted when the diameter arrives at that of the standard part.

FIG. 6 is an example of use of the measuring arrangement according to the invention. Here there has been shown a crankshaft 90 for which the cylindrical bearing surfaces 81, 82 and 83 are to be machined. In order to reduce the diameter of such bearing surfaces, one employs grinders 84, 85 and 86, the bearing force of which is opposed by back rests 87, 88 and 89. For the measurement of the diameter during machining, one is in the presence here of narrow and deep zones. The access to such zones is greatly facilitated by the measuring arrangement in accordance with the invention since it shows a very small thickness. If the pneumatic sensor exhibits a diameter on the order of 6 mm, it is then possible to offer an arrangement not exceeding 9 mm in width. In FIG. 6, there has been shown an arrangement 1 the head opening of which is found in contact with the bearing 83 and two other arrangements 1 withdrawn from the measurement zone. It has already been seen that the arrangement 1 is secured to a support 90, itself fastened to a carriage 91. Carriage 91 may slide along a slideway 92 and one may thus withdrawn the arrangement outside the operating field, with even a greater withdrawal than has been shown on the figure. FIG. 6 clearly shows that the entire arrangement does not exceed the thickness of head 5, be it the projection 55, blades 47 and 48, sleeve 51, the upper element 25 and the support 90.

What I claim is:

1. A measuring arrangement, in particular in a machine tool, for interrupting the machining operation on a cylindrical part when such part has attained a predetermined diameter, such arrangement including:
    a head exhibiting an opening provided with two rectilinear ridges positioned in the form of a V and adapted to bear against the part to be machined, said head showing two parallel faces substantially perpendicular to the axis of the part to be machined, said parallel faces defining the thickness of the head,
    a sensor mounted on such head and arranged along the bisector of the angle formed by the two ridges, said sensor furnishing a signal representative of the diameter of the cylindrical part, the head being oriented relative to the part to be machined in a manner such that said bisector is situated in a plane substantially parallel to the horizontal,
    means coupling the head to a base fixed to the machine frame in order to assure contact of said ridges with the cylindrical part during the machining operation, said coupling means being arranged so as to assure the mobility and the retention of the head in a plane X-Y substantially perpendicular to the axis of the cylindrical part to be machined,
    elastic urging means urging the head against the part to be machined, and
    elastic sustaining means for sustaining the head with its coupling means on the base fixed to said machine frame, said sensor, said coupling means, said elastic urging means, and said elastic sustaining means all being located within a space bounded by the extension of said two parallel faces defining the thickness of the head.

2. An arrangement as set forth in claim 1 wherein the sensor comprises a pneumatic sensor.

3. An arrangement as set forth in claim 2 wherein the head includes a coarse adjustment means and a fine adjustment means for the sensor relative to the part to be machined.

4. An arrangement as set forth in claim 1 wherein the coupling means include an upper element and a lower element located respectively above and below the axis of the part to be machined, said elements being coupled to said head through first guide means permitting a horizontal displacement X of the head according to a predetermined course, said elements furthermore being coupled to the base fixed to the machine frame through second guide means permitting a vertical displacement Y of the head according to a predetermined course, wherein the elastic urging means urging the head against the part to be machined include first springs bearing, on the one hand against the head and, on the other hand, in a housing formed in each of the upper and lower elements, and wherein the elastic sustaining means for the head with its coupling means include a second spring located in a housing formed in the base and bearing against the upper element in order to compensate for the weight of the head with its coupling means.

5. An arrangement as set forth in claim 4 wherein the first guide means comprise elastic blades arranged in pairs, the first pair coupling the upper element to the head and the second pair coupling the lower element to said head, the head and the upper and lower elements being provided with course limiting projections.

6. An arrangement as set forth in claim 4 wherein the second guide means each comprise an elastic blade, the first blade coupling the upper element to the base fixed to the machine frame, the second blade coupling the lower element to said base, said upper and lower elements and said base being provided with course limiting projections.

7. An arrangement as set forth in claim 4 wherein the housings formed in each of the upper and lower elements and receiving the first springs include a screw in order to enable adjustment of the bearing force of the head against the part to be machined.

8. An arrangement as set forth in claim 4 wherein the housing formed in the base and receiving the second spring includes a screw in order to enable adjustment of the sustaining force compensating for the weight of the head with its coupling means.

9. An arrangement as set forth in claim 4 wherein the head, the upper and lower elements and the base are assembled by means of screws.

* * * * *